(No Model.) 2 Sheets—Sheet 1.
F. H. RICHARDS.
PNEUMATIC MOTOR.
No. 445,602. Patented Feb. 3, 1891.
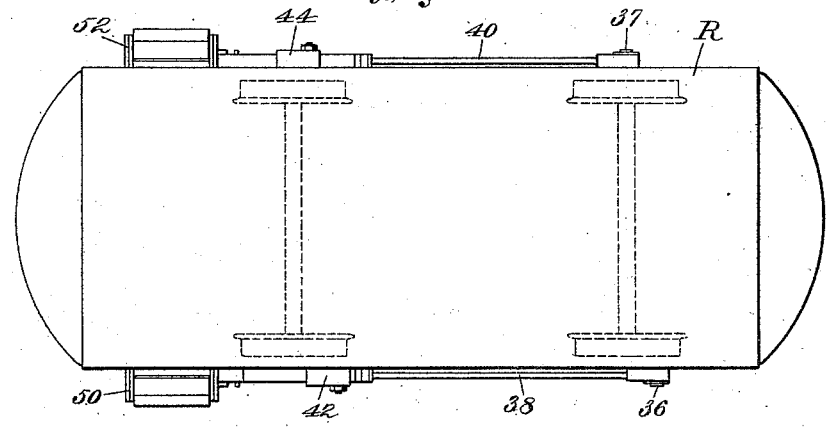
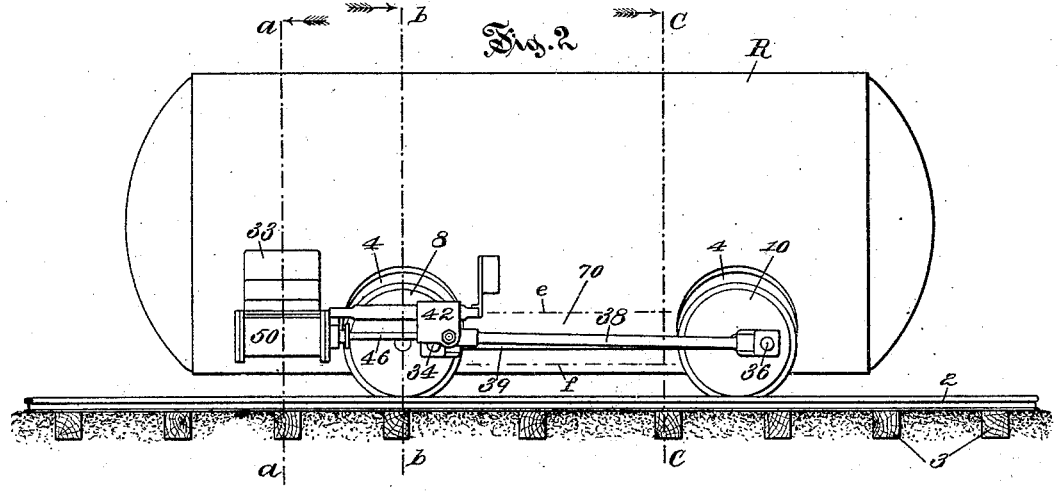
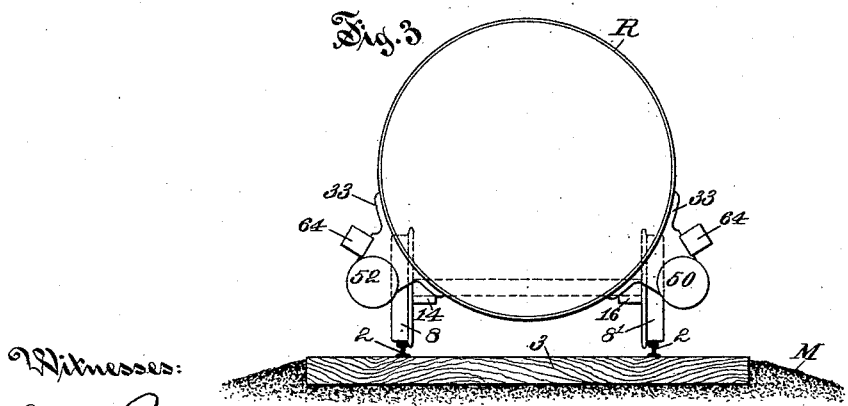
Witnesses:
W. M. Bjorkman
Henry L. Reckard
Inventor:
Francis H. Richards (No Model.) 2 Sheets—Sheet 2.
F. H. RICHARDS.
PNEUMATIC MOTOR.
No. 445,602. Patented Feb. 3, 1891.
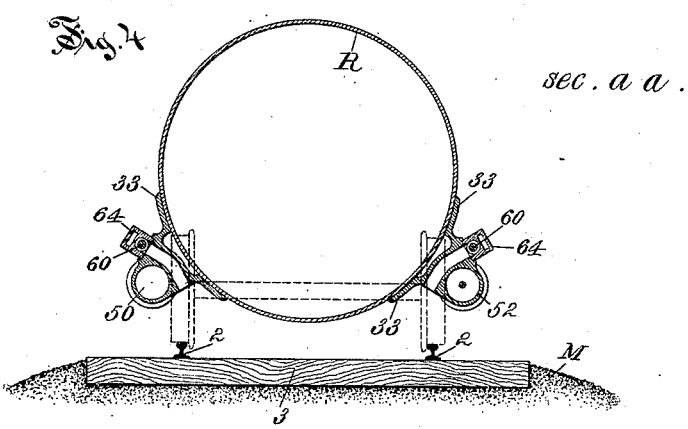
Fig. 4. sec. a a.
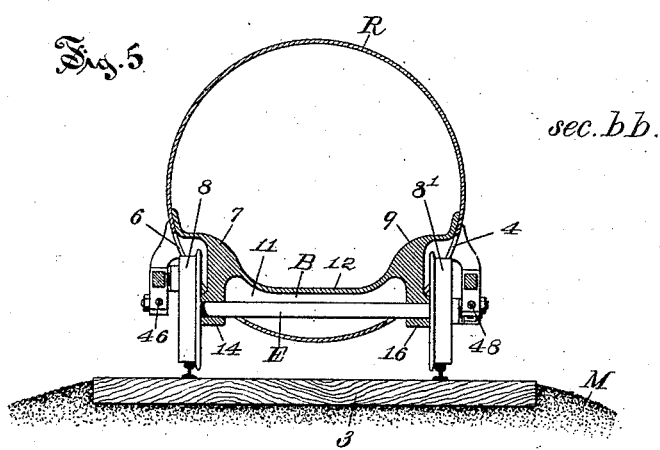
Fig. 5. sec. b b.
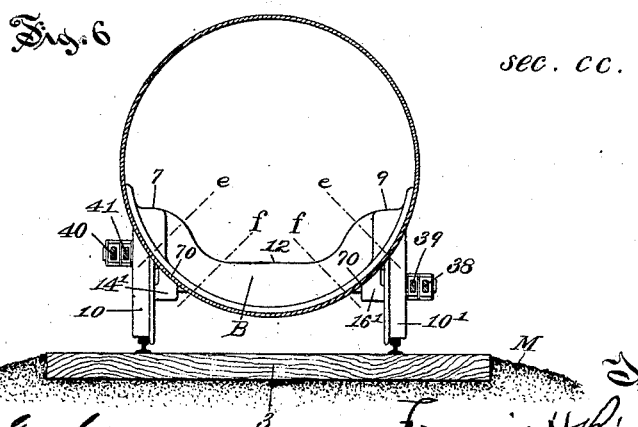
Fig. 6. sec. c c.
Witnesses:
W. M. Bjorkman
Henry L. Rickard.
Inventor:
Francis H. Richards.

UNITED STATES PATENT OFFICE.

FRANCIS H. RICHARDS, OF HARTFORD, CONNECTICUT, ASSIGNOR TO ECKLEY B. COXE, OF DRIFTON, PENNSYLVANIA.

PNEUMATIC MOTOR.

SPECIFICATION forming part of Letters Patent No. 445,602, dated February 3, 1891.

Application filed October 1, 1889. Renewed July 11, 1890. Serial No. 358,399. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Pneumatic Motors, of which the following is a specification.

This invention relates to pneumatic motors, and to the construction of the tank and framework thereof, the object being to utilize the tank as the principal part of the frame-work, and also to provide a system or mode of motor construction which permits the use of a very large tank or reservoir relatively to the other parts of the motor.

In the drawings accompanying and forming a part of this specification, Figure 1 is a plan view of a motor embodying my present improvements. Fig. 2 is a side elevation of the same. Fig. 3 is an end elevation as seen from the left hand in Fig. 2. Figs. 4, 5, and 6 are sectional elevations in lines $a\ a, b\ b,$ and $c\ c,$ respectively, in Fig. 2.

Similar characters designate like parts in all the figures.

My present improvements are especially designed for use in connection with a tank or reservoir R of larger diameter than the width or "gage" of the track, whose rails 2 2 lie on the usual cross-ties 3, that are embedded in the embankment M in the usual manner. The reservoir has in the sides thereof openings or perforations 4 and 6, into which the upper edges of the wheels 8 8' and 10 10' project. Said openings are covered by the re enforcing frame B, united to said shell by numerous rivets or bolts (not shown) whose opposite and similarly-formed ends 7 and 9 are inwardly deflected or "bulged" to form a kind of arch for resisting the pressure of air within the tank R, and to form pockets for the said upper edges of the wheels. The middle portion 12 of said part B forms an arched beam, which connects the two arches 7 and 9 and forms a channel 11 within the shell R (see Fig. 5) for the axle E, carrying the wheels 8 and 8'. This axle is or may be carried in driving-boxes 14 16, which are formed on or attached to the said frames B, or to the shell R, as may be preferred; but I prefer to use for this part of my improved motor the improvements described in my application, Serial No. 305,999, filed April 4, 1889, to which reference may be had.

The wheels, when the apparatus is provided with engines, are furnished with crank-pins 34 36 and 35 37, by which the two axles are driven by the main rods 38 40 and the usual parallel rods 39 and 41 through the cross-heads 42 44 and piston-rods 46 48 from the cylinders 50 and 52, respectively. The cylinders are attached by their flanges 33 to the shell of the tank, substantially as shown, and are to be furnished with a suitable valve-gear (not shown) for actuating the valves 60 in the valve-chest 64. This gear, owing to the arrangement of the axles, is preferably some well-known kind operated from the cross-heads, since it is inconvenient to employ the eccentrics of the usual "Stephenson" link-motion. Other necessary and convenient details not relating to the present improvements are omitted.

By means of the construction and organization herein set forth I furnish a motor adapted to be driven by compressed air and having a tank or reservoir of unusually-large capacity relative to the size of "gangway" of the mine or other passage in which the motor is to be used. This permits the use of a lower initial pressure for a given load and trip or "run," thereby effecting an important saving in the power necessary for compressing the air; also the use of the shell R as the frame-work of the engines, said frame extending below the axles, renders unnecessary the usual frames, thus effecting a large saving in the first cost of the motor.

It will be observed that a portion 70 of the shell R, which lies between the lines $e$ and $f,$ Figs. 2 and 6, lies also in a direct horizontal line between the bearings, as 14 and 14' or 16 and 16' of the two axles, and that by reason of the perforated shell and the position of the axles therein said portion 70 constitutes a thrust member or beam directly in the line of the strains to be resisted, so that the shell constitutes not only the reservoir, but becomes also a suitable and effective frame-work for the engines.

Some of the features shown and described, but not claimed herein, being of my invention, constitute in part the subject-matter of a separate application, Serial No. 305,999, filed April 4, 1889, to which reference may be had.

Having thus described my invention, I claim—

1. In a motor, the combination, with a structure, substantially as described, constituting the reservoir and frame-work and having transverse passages therein, substantially as described, of the wheel-provided axles passing through said passages and carried by bearings on said frame-work, the motor-cylinders carried on said reservoir, and connections, substantially as described, connecting said cylinders with said wheels, substantially as described.

2. In a motor, the combination, with the cylindrical structure constituting the reservoir and having therein passages for the axles and wheel-pockets, substantially as described, of the wheel-provided axles passing through said passages and carried in bearings supported on said reservoir, the whole being constructed and organized to bring a portion of the shell of said reservoir substantially in a line between the bearings of the respective axles, whereby said portion constitutes a direct-thrust member, all substantially as described.

3. In a motor, the combination, with the cylindrical shell R, having therein transverse covered passages and wheel-pockets, substantially as described, of the wheel-provided axles passing through said shell and carried in bearings thereon, the motor-cylinders attached to the shell, and the connections actuating the wheels from the cylinders, all substantially as shown and described.

FRANCIS H. RICHARDS.

Witnesses:
HENRY L. RICKARD,
LEWIS C. HEERMANN.